(No Model.) 2 Sheets—Sheet 1.
J. B. THIES.
LIQUID MIXER.
No. 519,978. Patented May 15, 1894.
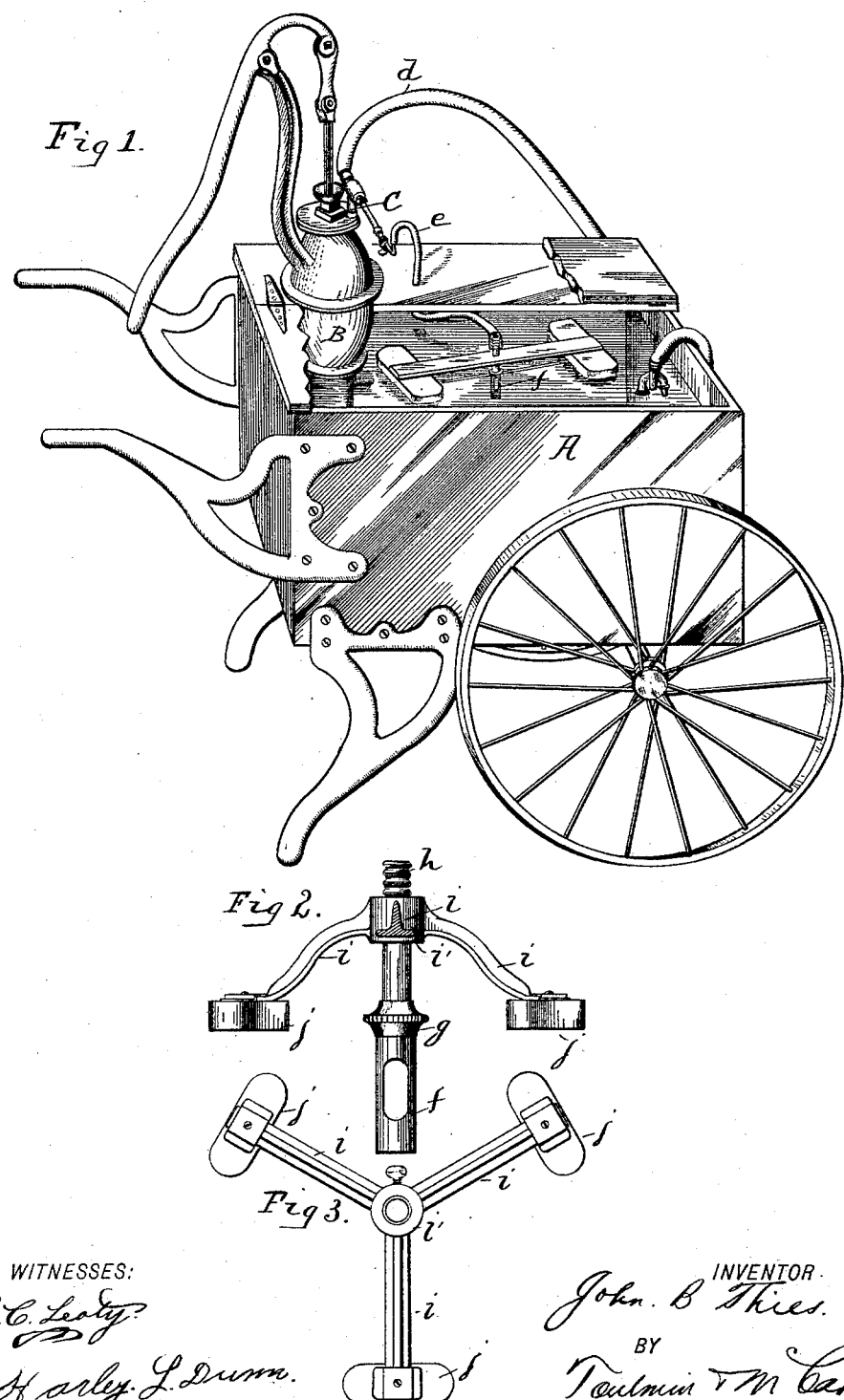

(No Model.) 2 Sheets—Sheet 2.
J. B. THIES.
LIQUID MIXER.
No. 519,978. Patented May 15, 1894.
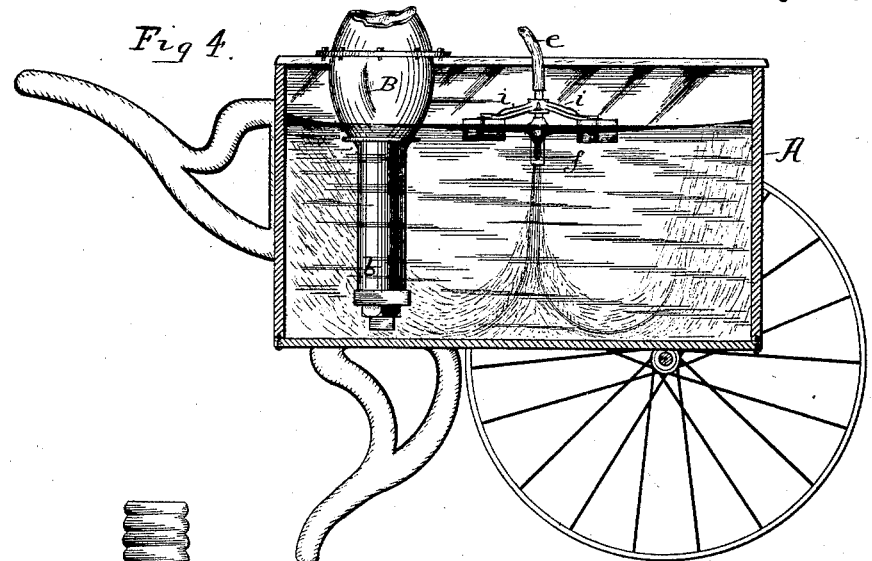
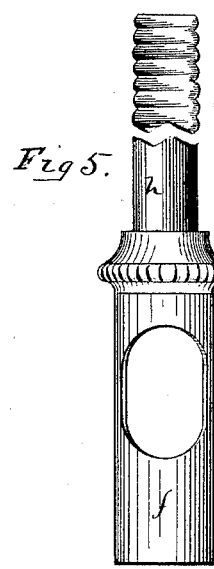
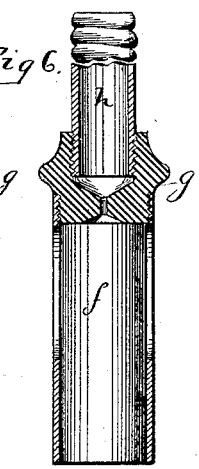
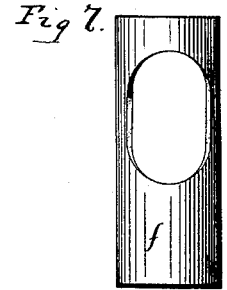
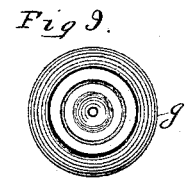
WITNESSES:
L. C. Leoty
R. C. Douthitt
INVENTOR
John B. Thies.
BY
Toulmin & McCarty
ATTORNEYS

UNITED STATES PATENT OFFICE.

JOHN B. THIES, OF DAYTON, OHIO, ASSIGNOR TO THE GEM CITY MANUFACTURING COMPANY, OF SAME PLACE.

LIQUID-MIXER.

SPECIFICATION forming part of Letters Patent No. 519,978, dated May 15, 1894.

Application filed June 3, 1893. Serial No. 476,469. (No model.)

*To all whom it may concern:*

Be it known that I, JOHN B. THIES, of Dayton, county of Montgomery, State of Ohio, have invented a new and useful Improvement in Liquid-Mixers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improved means for thoroughly mixing liquids of unequal densities such as the various oils that have a low specific gravity, and water.

The object of my invention is to commingle certain oils, such as kerosene, naphtha, benzine, carbolic acid, or any of the various other well known insecticides, disinfectants and deodorants, having specific gravities ranging between 70° and 85° with certain proportions of water, for the purpose of spraying the same as will be hereinafter described. It is affirmed by those versed in entomology that petroleum, otherwise known as kerosene, is one of the most powerful, effective and valuable insecticides known to this science, when thoroughly mixed with water in the proper proportions; heretofore this admixture has been attempted by methods of agitation that fail to mix in equal proportions, owing to the specific gravity of the oil being considerably less than that of water, and the presence of air interfering with the process. The mixture has been possible in the resultant form of a mucilaginous substance, or an emulsion, by compounding the oil with ingredients having more or less neutralizing or transforming properties, such as soap, milk, &c.; the alkaline properties of the former, tend, however, to exert a deleterious influence upon the foliage on which the emulsion is used, while the latter is an expensive and otherwise undesirable ingredient for the purposes named; by the employment of my improved apparatus a perfect administration of this, the best known of insecticides, is had, and at a minimum of cost, upon the most frail and tender foliage as well as upon the most vigorous. I have made extensive experiments and find that when applied as it may be, through the agency of my improvement, the kerosene becomes thoroughly mixed with water, and the same mechanical means employed to deliver the solution to the plant preserves it while being so administered, in its mixed condition, by continuing the agitation of the liquid thus commingled. In this condition it may be used to destroy and exterminate most any of the different insects that infest vegetation; its action being that of an outer irritant to non-mandibulate insects, while to those of the mandibulate species, it renders their food undesirable.

The use of my improved mixing apparatus is available in a field still more important than the one just mentioned, to wit, as an agency for the distribution of disinfectants and deodorants, to destroy the existence or prevent the creation of germinal life, which is well known to be a powerful agent in the spread of contagious disease.

To these ends my invention carries out the process of mixing oils or other ingredients of a less specific gravity than water with the latter, by entirely excluding air from the vicinity where the agitation or mixing is done.

For a detailed description of my invention, reference is made to the accompanying drawings, forming part of this specification, on which like letters of reference appear on corresponding parts.

Figure 1 is a view in perspective, of the pump and tank, mounted on wheels for conveyance from one point to another; Fig. 2 a detached, detail side elevation of the triple arm buoy or float with the nozzle and mixing tube attached thereto, one of the arms appearing in section; Fig. 3 a plan view of the same; Fig. 4 a longitudinal section through the tank, showing the liquid contents, a depression in the surface thereof, and a stream entering through the mixing tube; Fig. 5 an enlarged, detail view in elevation, of the nozzle and mixing tube; Fig. 6. a vertical section of the same; Fig. 7. an enlarged detail view of the mixing tube, detached from the nozzle; Fig. 8. a plan view of the same; Fig. 9. a plan view of Fig. 5; Fig. 10. a detail view of the screw, detached from the nozzle.

In the embodiment of my invention in practical shape, I provide a tank A, having any desirable capacity, which I mount on wheels and provide with legs and handles, by the means of which the same may be easily moved from one point to another; in one end or any suitable part of this portable tank, I locate an ordinary force pump B, so as to place the valve or section end *b* thereof, near the bottom of the tank, substantially as shown in Fig. 4, in order that it may completely or nearly exhaust the tank of its contents before replenishing is necessary. The proportions of the ingredients to be placed in this tank for mixing, vary according to the uses to which they are to be applied.

My experience warrants the use of the following proportions for spraying plants of a very tender nature, to wit, one gallon of kerosene to twenty two of water, while in the treatment of plants of a more vigorous nature, proportions of one gallon to eighteen may be used with good results.

It is not within, the purview of this specification to set forth in detail the numerous formulas for preparing insecticides and fungicides for distribution through the medium of my invention, as the different natures of the animal and vegetable life has much to do with this, therefore, suffice it to say that the proper proportions are placed in the receiving tank; so placed and while in a quiescent state, by a well known law of nature, the one having the less specific gravity, surmounts the other, in position as is depicted in Fig. 4; the dark horizontal outline extending across the surface of the liquid, representing in this instance, kerosene, while the lower body represents water; the design of this view is to represent the liquids just in the act of being agitated.

C designates a T-shaped outlet upon the respective ends of which the outlet and inlet hose *d* and *e* are attached; any suitable spraying nozzle may be attached to the outlet hose, I prefer, however, the use of a combination nozzle patented by myself May 16, 1893.

*f* indicates the mixer or tube which is provided with oblong orifices through the median portion of its opposite sides, the objects and purposes of which are important, and will receive further attention hereinafter. The upper extremity of this tube is provided with internal screw-threads, designed to engage with external screw threads on the nozzle *g*, through which there is a circular opening, substantially as shown in Fig. 6, capable of delivering a solid stream in the mixing tube; this nozzle is, provided with a stem *h*, by means of which an attachment is made with the hose.

In order that a proper position of the mixing tube may be maintained, which as appears in Fig. 4, is a position wherein the entire oblong orifices in said tube are submerged to a point below the surface of the liquid, I provide a buoy or float consisting of a plurality of arms *i, i, i*, radiating from a center piece having a socket *i'* in which the nozzle is adjustably attached by means of a set screw *i''*; blocks *j, j, j*, constructed of any suitable material, with hollow interiors, are attached to the ends of the arms, to secure a specific lightness and requisite buoyancy of the float. In Fig. 1, this device is shown constructed of a single piece, with T-shaped ends; the preferred form is that shown in Figs. 2 and 3, which readily adapts itself to the undulating surface of the agitated liquid; and further, a free approach of the liquid to the center of the float, through the spaces between the arms, is permissible, therefore, the lighter liquid is not retarded when suction is created. It is understood that liquids whose specific gravities are less than that of water, if used in varying quantities will cause the float to occupy a higher or lower horizontal plane, hence the necessity of providing said float with means for adjusting the nozzle, so as to bring the orifices in the mixing tube a proper distance in the liquid to prevent the entry of air.

Briefly stated, the process or operation of mixing is accomplished by placing the mixing tube below the surface of the liquid, and forcing a sharp stream through the nozzle centrally through said tube, this in the absence of air, creates a vacuum, which is quickly filled by the liquid nearest the orifices in the tube; when ingredients desired to be used are of a less specific gravity, it follows that the strong suction caused by the sharp stream being forced through said tube, forcibly draws these ingredients to that point; once, inside the tube, the lighter ingredient is forced downward, striking the bottom of the tank, is divided and dispersed in every direction, and thus becomes thoroughly mixed with the water; the valve end of the pump takes up the liquid in this thoroughly mixed form; it is forced through said pump, a portion to be distributed through the spraying nozzle, and a portion to be returned to the tank to continue the agitation of the liquid therein.

Fig. 4. shows a depression of the surface of the liquid, which it will be understood is due to the lighter element being drawn to the mixing point by the suction herein-before referred to.

Having described my invention, I claim and desire to secure by Letters Patent—

1. The combination with a portable tank, a force pump attached to said tank with T-shaped outlets for the attachment of hose through which a portion of the liquid contained in said tank is returned thereto to maintain an agitation of the liquid remaining in the tank, while a portion is sprayed on external objects, of a nozzle having a central opening attached to the hose leading to the tank, a mixer consisting of a tube having orifices in the median portion thereof, attached to said nozzle, and means for maintaining said tube sufficiently submerged in the liquid to exclude the entry of air therein, substantially as and for the purposes specified.

2. An apparatus for mixing ingredients of less specific gravity with water, consisting of a tank in which the liquid is contained, a force pump attached to said tank with a two-fold outlet for the attachment of hose, a mixer consisting of a tube with orifices in the sides thereof, a nozzle attached to said tube and to the hose leading from one of the outlets, means for maintaining said tube submerged in the liquid to a point above the orifices, so as to exclude the admittance of air while the liquid contents of the tank are being agitated by means of the pump returning a constant stream in said tank from whence it is taken, substantially as herein specified.

3. The combination with the portable tank, of a mixer consisting of a tube having orifices in the median portion thereof, a nozzle having a central opening to which said tube is attached, and the means herein described for maintaining a continuous agitation of the liquid contents of said tank by delivering a stream through said nozzle and mixer at a point below the surface of the liquid, substantially as herein described.

4. In an apparatus for mixing oils of a less specific gravity with water, the combination with the tank and pump, of a mixer consisting of a perforated tube, a nozzle to which said tube is attached, a buoy or float to maintain said tube in a proper position with reference to the liquid contents of the tank, consisting of a plurality of arms radiating from a central socket, a set screw entering said socket, substantially as herein specified.

5. In an apparatus of the character specified, the combination of a nozzle having a stem and a central opening, a perforated tube attached thereto, and means for adjusting said tube consisting of a triple arm buoy or float having a socket and set screw and blocks attached to the ends of said arms with hollow interiors by means of which a specific lightness is imparted to said float.

In testimony whereof I have hereunto set my hand this 16th day of May, 1893.

JOHN B. THIES.

Witnesses:
JOSEPH A. WORTMAN,
R. J. McCARTY.